United States Patent Office 3,595,619
Patented July 27, 1971

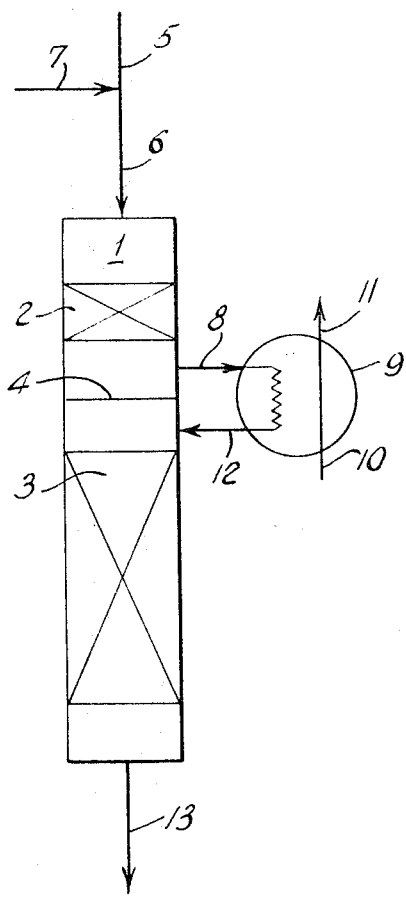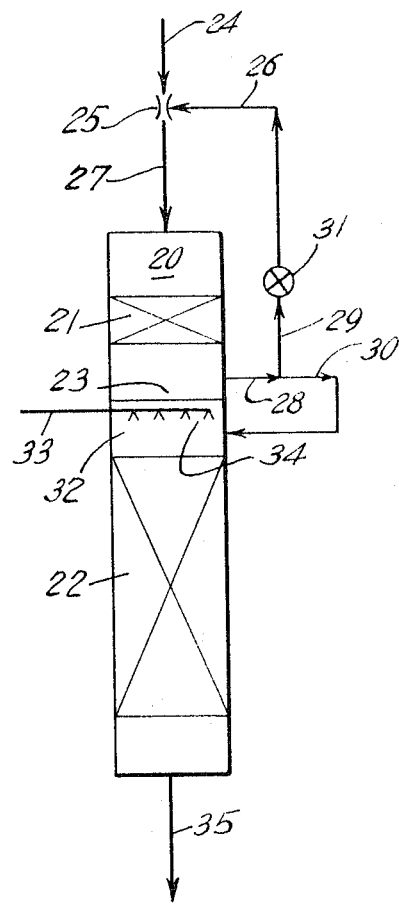

3,595,619
SHIFT CONVERSION PROCESS FOR PRODUCTION OF HYDROGEN
William L. Slater, La Habra, Calif., James R. Muenger, Beacon, N.Y., and Warren G. Schlinger, Pasadena, and Allen M. Robin, Claremont, Calif., assignors to Texaco Inc., New York, N.Y.
Filed Mar. 29, 1968, Ser. No. 717,240
Int. Cl. C01b 1/03
U.S. Cl. 23—213
14 Claims

ABSTRACT OF THE DISCLOSURE

In a steady-state continuous flow fixed-bed water-gas catalyst shift conversion reactor comprising a plurality of separate catalyst beds in series at a temperature in the range of about 350° F. to 1050° F. and a pressure in the range of about 1 to 250 atmospheres, a gaseous feed stream comprising $H_2O$ and CO is converted into $H_2$ and $CO_2$. A fraction of the effluent gas stream from the first catalyst bed in the reactor is recycled and mixed with a fresh feed stream of process gas e.g. synthesis gas to comprise said gaseous feed stream to the first catalyst bed. The residual fraction of said effluent gas stream is cooled and introduced into the second catalyst bed in the reactor. CO conversion is improved, process feed steam requirements are reduced, less catalyst is needed, undesirable back and side reactions are minimized, and the system is stabilized. Operating the system at high pressure also reduces overall catalyst requirements.

BACKGROUND OF THE INVENTION

Field of the invention

This invention relates to a process for producing hydrogen. More specifically it relates to a high pressure continuous catalytic shift conversion process for producing hydrogen from a mixture of steam and synthesis gas.

Description of the prior art

The contact water-gas process is commonly used for the production of hydrogen. Hydrogen is used in applications such as ammonia synthesis and in the manufacture of fuels from coal, tar, and other hydrocarbons.

The water-gas shift conversion reaction is represented stoichiometrically by Equation 1.

$$CO + H_2O \rightleftharpoons CO_2 + H_2 \qquad (1)$$

This reaction is exothermic, liberating 16,400 B.t.u.'s per mole of CO converted. Optimum approximation to the calculated equilibrium is possible only with a good catalyst. A typical commercial water-gas shift conversion catalyst comprises about 90% $Fe_2O_3$ and about 10% $Cr_2O_3$.

Increasing the concentration of steam in Equation 1 moves the equilibrium in the direction of greater conversion into hydrogen and carbon dioxide. Thus the economic feasibility of conventional shift conversion processes depends on the availability of low cost plant steam at sufficient pressure.

Efficient heat interchange and temperature control are difficult to maintain in conventional shift converters. Temperature variations and system instabilities may significantly shorten the useful life of the catalyst and affect the percent CO conversion.

SUMMARY

By the process of our invention a gaseous feedstream comprising $H_2O$ and CO is reacted in the first catalyst bed of a steady-state continuous flow fixed-bed reactor comprising a plurality of separate catalyst beds in series at a temperature in the range of about 350° F. to 1050° F. and a pressure in the range of about 1 to 250 atmospheres. The effluent gas stream from the first catalyst bed comprising $H_2$ and $CO_2$ and unreacted $H_2O$ and CO is divided into a recycle gas stream and a residue gas stream. The residue gas stream is cooled and introduced as feed into the second catalyst bed. The recycle gas stream is mixed with a separate stream of process gas (fresh feed gas) e.g. synthesis gas comprising CO, $H_2$ and $H_2O$ to produce said gaseous feed stream for the first catalyst bed. Further, the effluent gas stream from the second catalyst bed of a two bed reactor constitutes the product gas stream; or in a 3-bed reactor this effluent gas stream may be cooled and introduced into the third catalyst bed as the feedstream for conversion. The effluent gas stream from each successive bed in the reactor is produced with an increasingly higher $H_2O$/CO mole ratio and at a lower exit temperature. Multibed reactors usually comprise only 2 or 3 separate beds of catalyst in series to effect the desired conversion. Furthermore, the composition of the catalyst in each bed may be varied if desired.

Use of recycle gas improves CO conversion, reduces the feed steam requirements, effects a savings of catalyst, minimizes undesirable back and side reactions, and stabilizes the system. Operating the reactor at high pressure also reduces overall catalyst requirements.

It is therefore a principal object of the present invention to produce hydrogen from large volumes of synthesis gas over a wide range of pressures.

Another object of this invention is to provide a continuous process by which essentially all of the carbon monoxide in synthesis gas is economically and efficiently utilized for the production of hydrogen.

Still another object of this invention is to realize a high level of CO conversion in a water-gas shift conversion process while providing reduced overall catalyst requirements; lower steam content in the fresh feed to the reactor; increased stability, selectivity, and activity of the catalyst; and efficient heat interchange and temperature control.

DESCRIPTION OF THE INVENTION

The present invention involves a novel continuous shift conversion process for converting gaseous mixtures of steam and synthesis gas into hydrogen and carbon dioxide. The composition of the synthesis gas feed may comprise from about 5 to 90 mole percent of CO. Feed gas may be derived from any of many well known gasification processes, such as by the partial oxidation of a hydrocarbon at pressures from 15 to 3500 p.s.i.g. The reaction takes place in a steady-state continuous flow fixed bed reactor comprising two or more beds of catalyst at a temperature in the range of 350° F. to 1050° F. and a pressure in the range of about 1 to 250 atmospheres.

A portion of the effluent gas stream discharged from the first catalyst bed is recycled and combined with a fresh stream of feed gas to the first catalyst bed. The residual gas stream in multibed reactors is cooled and introduced into the next bed of catalyst for further conversion. Cooling of the residual gas stream may be accomplished by indirect heat exchange in an external cooler such as in a waste heat boiler or by direct condensate injection between beds. Direct condensate injection results in a smaller overall reactor than a reactor using heat exchangers due to the higher steam to dry gas ratio (driving force) in the second bed for the same amount of cooling between beds.

By the scheme of recycling a portion of the effluent gas, the sensible heat in the recycle gas stream may be combined with the sensible heat in the stream of fresh feed gas. As the recycle ratio is increased, the temperature of the combined gaseous feedstream is increased. Thus, the catalyst bed may be operated at a higher average temperature which increases the reaction rate and compensates for the lowered driving force due to the reduced steam to dry gas ratio. A recycle ratio of 0.5 to 3 is suitable.

Furthermore, thermal advantage may be taken of the sensible heat found in the effluent gas stream leaving the last bed of the converter to preheat the process feedstream (fresh feed gas) destined for the first catalyst bed by noncontact indirect heat exchange. Thus, a portion of the heat required to raise the feed gas to its reaction temperature is thereby provided and a separate fresh feed gas preheater may be eliminated.

As previously mentioned, an excess of steam is required for satisfactory converter operation; for example, steam is required to drive the shift conversion reaction forward as shown in Equation 1 or to minimize the side reactions shown in Equations 2 and 3.

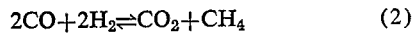

$$2CO + 2H_2 \rightleftharpoons CO_2 + CH_4 \quad (2)$$

$$2CO \rightleftharpoons CO_2 + C \quad (3)$$

At very low steam ratios the exothermic methanation reaction (Equation 2) may cause dangerously high temperatures; also, the hydrogen yield is reduced when methane is formed. The $H_2O/CO$ mole ratio of the feed gas being introduced into a bed is much lower than the $H_2O/CO$ mole ratio of the effluent gas stream leaving the bed. For example, the $H_2O/CO$ mole ratio may vary from about 0.5 to 4.0 at the bed inlet and from about 5 to 15 at the bed outlet. Thus by adding recycle stock to the fresh feed gas the $H_2O/CO$ mole ratio in the combined gaseous feed stream to a bed is increased. By this scheme, the cost of adding externally generated high pressure plant steam may be avoided.

Temperature stability in a catalyst bed is improved by adding recycle gas to the gaseous feed stream which is due in part to the added heat capacity of the converted material in the recycle gas stream. Further, when the gaseous feed stream has a higher heat capacity, per unit of CO, the catalyst bed may be operated at a higher average temperature for a given conversion without exceeding the maximum temperature restraint.

The reduction in overall catalyst requirements that can be achieved by recycling a portion of the gases leaving the first bed of a multibed shift converter increases as the number of beds decreases and as the operating pressure decreases. The smaller reduction in catalyst volume at higher pressure than at lower pressures is due to the increase in catalyst activity at higher pressure, forcing a reduction in the size of the first bed relative to the second bed in order to remain within the maximum allowable catalyst temperature.

Conventional shift conversion catalysts may be employed in the process of our invention. For example, over a temperature range of about 600 to 1050° F. a suitable catalyst comprises iron oxide promoted by 1 to 15 percent by weight of an oxide of a metal such as chromium, thorium, uranium, beryllium and antimony. This catalyst is characterized by heat stability (up to 1184° F.), high activity, good selectivity, resistance to poisoning, constant volume, and long life. It may be obtained in the form of pellets or irregular fragments that range in size from about 5 to 10 mm. and larger, or tablets ranging from ¼ in. to ⅜ in. diameter. For low temperature shift reactions (about 350 to 650° F.) the catalyst may comprise mixtures of copper and zinc salts or oxides in a weight ratio of about 3 parts zinc to 1 part copper.

BRIEF DESCRIPTION OF THE DRAWING

Other objects and advantages of the present invention will be apparent upon reference to the accompanying drawing wherein, FIG. 1 is a flow diagram of a multibed shift converter employing no recycle and is included for comparison with the recycled steady-state continuous flow shift converter shown in FIG. 2 which is one embodiment of our invention. Although the shift converter described here comprises a two bed reactor, it is understood that the principles of the invention are applicable to shift converters comprising two or more fixed beds.

The shift converter illustrated in FIG. 1 involves no recycle and comprises a multibed converting tower 1 including catalyst bed 2 and catalyst bed 3 separated by diaphragm 4. A gaseous feed stream in line 5 containing CO and $H_2O$ for conversion is fed through line 6 into catalyst bed 2. Additional steam, if required, is introduced into the gas mixture in line 6 through a branch line 7. Hot partially converted effluent gases leave bed 2 by way of line 8 and are introduced into cooler 9. Cooler 9 may be a waste heat boiler or a similar noncontact indirect heat exchanger. Boiler feed water enters cooler 9 through line 10 and leaves by line 11. Cooled gases from cooler 9 are fed through line 12 into catalyst bed 3. The gaseous product stream departs from converter 1 by way of line 13.

A shift converter with recycle around the first bed is depicted in FIG. 2. This embodiment of our invention comprises multibed converting tower 20, including a first catalyst bed 21 in series with a second catalyst bed 22 and separated by diaphragm 23. A stream of process gas (fresh feed) in line 24 containing CO for conversion and some steam is mixed by means of injector 25 with a recycle stream of gas from line 26 and introduced into the first catalyst bed 21 by way of line 27. A hot partially converted effluent gas stream is removed from first bed 21, by way of line 28 and is divided then into a recycle gas stream 29 and a residual gas stream 30. Recycle gas stream 28 is recycled to the inlet to converter 20 by way of line 29, valve 31, and line 26. The residual gas stream in line 30 is introduced into chamber 32 located above the second catalyst bed 22. Cooling water enters chamber 32 through line 33 and sprayheads 34. The residual gas stream from line 30 is cooled by direct contact with the water spray. Some $H_2O$ vaporizes into the feed gas stream, which increases the $H_2O$/dry gas ratio and the driving force of the shift conversion reaction in the second catalyst bed 22. However to avoid catalyst destruction, care must be taken to prevent liquid $H_2O$ from contacting the hot catalyst. The gaseous product stream departs from converter 20 by way of line 35.

Alternate methods that improve the thermal efficiency of the system may be employed to cool the residual gas stream in line 30 before it is introduced as the feedstream to the second catalyst bed 22. For example a waste heat boiler or a noncontact indirect heat exchanger similar to cooler 9 in FIG. 1 may be used. Further, the stream of process gas (fresh feeed gas) before entering line 24 at the inlet to converter 20 may be preheated in a heat exchanger by noncontact indirect heat exchange with any one or combination of the following stream of hot gases: (1) recycle gas stream 29 on its way to injector 25; (2) residual gas stream 30, which is then introduced directly into the second catalyst bed 22 thereby eliminating the necessity for cooling by water spray 33 and 34; (3) product gas stream 35 or the effluent gas stream leaving the last catalyst bed; or (4) all of the effluent gas stream leaving the first catalyst bed 21 by way of line 28, after which the cooled effluent gas stream is divided into a recycle gas stream for recycle to injector 25 and a residual gas stream for direct introduction into the second catalyst bed 22.

DESCRIPTION OF THE PREFERRED EMBODIMENTS

The following examples are offered as a better understanding of the present invention but the invention is not to be construed as limited thereto. The examples presented here can illustrate only a few of the advantages of the process of our invention.

There are many degrees of freedom in process system conditions into which a multibed recycled shift converter may be fitted. Specific conditions will determine which of the possible advantages accure from recycle and to what extent.

Example I.—Operation of the steady-state plug flow fixed bed converter employing first bed recycle as shown in FIG. 2 is compared in Example I with the uncycled converter shown in FIG. 1, particularly with respect to initial $H_2O/CO$ minimum mole ratio (at inlet to first bed) and catalyst volume.

The following constraints are applicable to each system shown in FIGS. 1 and 2:

Compositions:
  Fresh feed gas composition, volume percent dry gas:
    CO—48.71, $H_2$—45.77; $CO_2$—3.81; $H_2S$ and inerts—1.71
  Composition of catalyst: 90% $Fe_2O_3$ and 10% $Cr_2O_3$.
  Composition of effluent gases leaving the first bed is the same.
Conversions:
  First bed conversion—0.69
  Overall conversion—0.90
Pressure—1300 p.s.i.g.

Pertinent data for these systems are summarized in Table I.

TABLE I

|  | Figure | |
|---|---|---|
|  | 1 | 2 |
| Recycle ratio; Moles of wet recycled gas per mole of wet process gas (fresh feed gas) | 0 | 1.0 |
| Relative flow rate: | | |
| First bed | 1 | 2 |
| Second bed | 1 | 1 |
| Inlet temperature, °F.: | | |
| First bed | 650 | 767 |
| Second bed | 633 | 633 |
| Outlet temperature, °F.: | | |
| First bed | 930 | 930 |
| Second bed | 705 | 705 |
| Volume of catalyst; Cu. Ft./1,000 s.c.f.h. dry gas feed: | | |
| First bed | 2.69 | 2.24 |
| Second bed | 14.70 | 14.70 |
| Overall volume | 17.39 | 16.94 |
| Overall catalyst savings compared with no recycle, percent | Base | 2.5 |
| $H_2O/CO$ minute mole ratio inlet to first bed | 2.00 | 2.53 |

The data in Table I show that recycling will increase the minimum $H_2O/CO$ mole ratio at the inlet to the first bed about 26%. For example, the HO/CO mole ratio of 2.0 for the uncycled system depicted in FIG. 1 was increased to 2.53 for the system in FIG. 2. Thus the steam requirements to provide the feed to the converter with a minimum $H_2O/CO$ ratio of for instance 2.53 may be satisfied without the added cost of steam from an external source. Satisfactory converter operation is thereby assured and undesirable side reactions (Equations 2 and 3) may be suppressed.

First bed recycle e.g. FIG. 2 is also attractive from the point of view of reducing the volume of catalyst or increasing the space velocity while maintaining a given conversion. Recycle gas may be used to raise the average bed temperature and thereby increase the reaction rate. This point will be further developed in Example II where the effect of varying the recycle ratio is discussed.

Example II.—It is demonstrated further in Example II that in a steady state plug flow multibed recycled shift conversion system as depicted in FIG. 2, a significant reduction in the amount of catalyst required, in comparison with the uncycled converter depicted in FIG. 1, may be accomplished with no loss of conversion or throughput. Furthermore, the percent reduction is greatest for the first catalyst bed. Also, the percent reduction of catalyst reaches a maximum at a recycle ratio of about 1 and decreases as the pressure of the system increases.

As the system pressure is increased, while the $H_2O/CO$ mole ratio at the inlet to the firt bed is held constant, the overall and first bed space velocities increase; also there is an increase in the average bed temperature and the heat capacity of the feed gas at inlet to the first bed. As previously discussed the percent reduction in overall and first bed catalyst volume is decreased as the system pressure is increased due to increased catalyst activity, even at a pressure of 1300 p.s.i.g., which forces a reduction in the size of the first bed relative to the second bed in order to remain within the maximum allowable catalyst temperature.

For comparative purposes, data illustrating the operation of an uncycled two bed shift converter containing a typical iron oxide catalyst is shown in Table II. Two initial feedstream $H_2O/CO$ mole ratios (2.0 and 2.5) are employed at a converter pressure of 600 p.s.i.g. and also at a pressure of 1300 p.s.i.g. The composition of the gaseous feed on a dry basis in volume percent is CO—48.71; $H_2$—45.77; $CO_2$—3.81; $H_2S$ and inerts 1.71; and is a process gas from a conventional partial oxidation generator employing a heavy fuel oil feed.

TABLE II.—NO RECYCLE

| | Run Number | | | |
|---|---|---|---|---|
| | 10 | 20 | 30 | 40 |
| Bed 1: | | | | |
| Inlet $H_2O/CO$, mole ratio | 2.5 | 2.0 | 2.0 | 2.5 |
| Inlet gas temperature, °F | 650 | 600 | 650 | 700 |
| Outlet gas temperature, °F | 930 | 930 | 930 | 930 |
| Space velocity, s.c.f.h. dry gas feed per cubic foot of catalyst | 2,410 | 1,488 | 3,723 | 6,020 |
| Conversion, percent | 69.2 | 71.4 | 69.0 | 65.6 |
| Bed 2: | | | | |
| Inlet gas temperature, °F | 687 | 638 | 633 | 680 |
| Outlet gas temperature, °F | 759 | 711 | 705 | 754 |
| Space velocity, dry gas | 768 | 455 | 679 | 1,133 |
| Conversion, percent | 20.8 | 18.6 | 21.0 | 24.4 |
| Overall: | | | | |
| Space velocity, dry gas | 582 | 348 | 575 | 953 |
| Pressure, p.s.i.g | 600 | 600 | 1,300 | 1,300 |
| Conversion, percent | 90.0 | 90.0 | 90.0 | 90.0 |

To illustrate the advantages of recycling a portion of the product gas leaving the first bed back to the inlet to the first bed, each run shown in Table II is repeated in Table III at four different recycle ratios (moles of wet product gas recycled per mole of wet process gas (fresh feed gas).

The recycle streams were determined to yield the identical exit gas composition from each first bed as that of the first bed of the corresponding reactor without recycle. The conversion in the first bed is generally not limited by equilibrium, but rather is limited by the large temperature rise due to the exothermic nature of the reaction in relation to the catalyst manufacturer's recommended maxium temperature constraint. Because of this latter constraint, true optimum conversion in the first bed cannot normally be achieved. Therefore, one is forced to a compromise and to operate with an inlet temperature low enough to get a reasonable temperature rise and high enough to get a reasonable intial reaction rate. With recycle, one can operate at a much higher average bed temperature without exceeding the manufacturer's recommended maximum temperature and hence achieve more conversion in less time.

The results of these runs are summarized in Table III.

It is apparent from the data for run numbers 10 to 24 made at 600 p.s.i.g. that the optimum recycle ratio is about 1.0; for, at this recycle ratio a maximum reduction in the size of the first bed is realized, i.e., 26.2% in run 12 and 31.1% in run 22. The corresponding increase in the initial H₂O/CO mole ratios at the inlet to the first bed is about 31.6% for run 12 (2.50 to 3.29), and about 28.0% for run 22 (2.00 to 2.56). Similarly, the same trend prevails for run numbers 30 to 44 made at 1300 p.s.i.g., wherein the maximum reduction in catalyst requirements for the first bed occurs at a recycle ratio of about 1.0. The smaller reduction in catalyst requirements for the runs made at 1300 p.s.i.g. compared with the runs made at 600 p.s.i.g. may be attributed to the increase in catalyst activity at the higher pressure, which effects a reduction in the size of the first bed relative to the second bed in order to remain within the maximum temperature that the catalyst will sustain without deteriorating.

Compared with the entering feed gas, the product gas leaves a catalyst bed at a higher temperature and at a higher steam to CO ratio. As the recycle ratio is increased, the heat capacity and the temperature of the mixed feed gas stream at the inlet to the first bed is increased allowing the first bed to be operated at a higher average temperature. The reaction rate in the first catalyst bed is thereby increased for the bed may be operated at a higher average temperature for a given conversion without exceeding the maximum temperature constraint.

The magnitude of the overall reduction in reactor size which can be achieved by the process of our invention depends on the ratio of the first bed to the other beds in a multibed reactor. Normally the first bed is the smallest bed and the amount of the catalyst required in the first bed decreases relative to the total amount of required catalyst as the number of beds increase. For operation at 600 p.s.i.g., the overall reduction in catalyst volume realized is about 7.4%, and this value decreases as the pressure increases. Thus with recycling, a greater overall catalyst reduction is achieved by decreasing the number of beds in the reactor and by decreasing the operating pressure.

As previously described, the undesirable methanation reaction is controlled by maintaining a proper initial steam to CO mole ratio. The advantages of recycle become particularly important, therefore, when sufficient steam is not readily available to raise the initial steam to CO ratio to an acceptable level to prevent the formation of methane with an attendant loss of hydrogen. In cases where enough steam is available without recycle to raise the inlet H₂O/CO mole ratio to the first catalyst bed to the equivalent value as obtained by recycling a part of the exit gases from the first bed, a new shift converter may be designed with an optimum catalyst volume. The greatly increased inlet H₂O/dry gas mole ratio to bed 1 for such an equivalent uncycled reactor is shown in Table III. For example in run 22 the first bed steam requirements for an equivalent uncycled reactor are about 82% greater than a recycled reactor per FIG. 2. The cost of the added steam in such uncycled systems represents an economic penalty which is avoided by the process of our invention.

The process of the invention has been described generally and by examples with reference to gaseous feedstocks, effluent gas streams, catalysts, and various other materials of particular composition for purposes of clarity and illustration only. From the foregoing it will be apparent to those skilled in the art that the various modifications of the process and the materials disclosed herein can be made without departure from the spirit of the invention.

We claim:

1. A process for producing a hydrogen rich gas by water gas shift conversion in a reaction zone comprising a single vessel containing a plurality of shift catalyst beds in series which process comprises
  (1) introducing a gaseous feedstream comprising CO, $H_2O$, $H_2$ and $CO_2$ into the first bed of shift catalyst in said reaction zone;
  (2) reacting said gaseous feedstream in (1) at a temperature in the range of about 350° F. to 1050° F. and at a pressure in the range of about 1 to 250 atmospheres to produce a partially converted effluent gas stream comprising $H_2$, $CO_2$, $H_2O$ and CO whose mole ratio of $H_2O$ to CO and temperature are substantially higher than those of said gaseous feedstream;
  (3) dividing the effluent gas stream from (2) into first and second streams of effluent gas, and recycling said first stream of effluent gas to the inlet to said first bed of shift catalyst in (1) where on a wet basis from about 0.5 to 3 moles of said stream of recycle gas are mixed with each mole of a fresh gas stream comprising $H_2O$ and CO thereby combining the sensible heats of said streams and producing said gaseous feedstream of (1) so that as the recycle ratio, as defined by the ratio of the moles of said stream of recycle gas to the moles of said fresh gas stream, is increased the temperature of the combined gaseous feedstream is increased to thereby achieve an increased reaction rate and a reduction in volume of catalyst in said first bed;
  (4) cooling said second stream of effluent gas from (3) to a temperature below the inlet temperature of the gaseous feedstream to the first catalyst bed in (1);
  (5) introducing said cooled gas stream from (4) into the second bed of shift catalyst in said reaction zone, the volume of catalyst in said second bed being greater than the volume of catalyst in said first bed;
  (6) reacting said cooled gas stream in (5) at a temperature in the range of about 350° F. to 800° F. but below the reaction temperature in said first catalyst bed; and
  (7) withdrawing said hydrogen rich product gas from (6).

2. The process of claim 1 wherein the cooling in (4) is accomplished by indirect heat exchange in a waste heat boiler.

3. The process of claim 1 wherein the cooling in (4) is accomplished by spraying said residual gas stream with $H_2O$ in an interbed spray zone before introducing said residual gas stream into the second catalyst bed for further conversion.

4. The process of claim 1 wherein the cooling in (4) is accomplished by passing said second stream of effluent gas in noncontact indirect heat exchange with the fresh gas stream of (3) before said fresh gas stream is mixed with said stream of recycle gas.

5. The process of claim 1 wherein prior to (3) said fresh gas stream is preheated by noncontact indirect heat exchange with the stream of product gas departing from the last catalyst bed.

6. The process of claim 1 wherein the recycle stream of gas in (3) is passed in noncontact countercurrent heat exchange with said fresh gas stream before said gas streams are mixed.

7. The process of claim 1 wherein the mixing of the gas streams in (3) is accomplished by means of an injector.

8. The process of claim 1 wherein from about .5 to 3 moles of recycle gas on the wet basis are mixed in (3) with each mole of wet fresh gas to produce said gaseous feed stream having a $H_2O/CO$ mole ratio of about 0.5–4 to 1 at the inlet and about 5–15 to 1 at the outlet of the first catalyst bed.

9. The process of claim 1 wherein the catalyst in said reaction-zone comprises about 90% by weight of $Fe_2O_3$ and 10% by weight of $Cr_2O_3$.

10. The process of claim 1 wherein the catalyst in the first bed is a high temperature shift conversion catalyst and the catalyst in all subsequent beds is a low temperature shift conversion catalyst.

11. The process of claim 10 wherein the high temperature shift conversion catalyst comprises about 90% by weight of $Fe_2O_3$ and 10% by weight of $Cr_2O_3$ and the low temperature catalyst comprises about 1 part by weight of copper oxide to about 3 parts by weight of zinc oxide.

12. The process of claim 1 wherein from about 0.5 to 1.5 moles of said recycle gas on the wet basis are mixed in (3) with each mole of wet fresh gas to produce said gaseous feedstream.

13. The process of claim 1 wherein the pressure is substantially the same in each catalyst bed and is in the range of about 30 to 250 atmospheres.

14. A process for producing a hydrogen rich gas by water gas shift conversion in a reaction zone comprising a single vessel containing a plurality of shift catalyst beds in series which process comprises
  (1) introducing a gaseous feed stream comprising CO, $H_2O$, $H_2$ and $CO_2$ into the first bed of shift catalyst in said reaction zone;
  (2) reacting said gaseous feedstream in (1) at a temperature in the range of about 350° F. to 1050° F. and at a pressure in the range of about 1 to 250 atmospheres to produce a partially converted effluent gas stream comprising $H_2$, $CO_2$, $H_2O$ and CO whose mole ratio of $H_2O$ to CO and temperature are substantially higher than those of said gaseous feedstream;
  (3) heating a fresh gas stream comprising $H_2O$ and CO by non-contact heat exchange with all of the partially converted effluent gas stream from (2) thereby cooling the partially converted effluent gas from (2);
  (4) dividing the cooled partially converted effluent gas stream from (3) into first and second streams of effluent gas, and recycling said first stream of effluent gas to the inlet to said first bed of shift catalyst in (1) where on a wet basis from about 0.5 to 3 moles of said first stream of effluent gas are mixed with each mole of the heated fresh gas stream from (3) thereby combining the sensible heats of said streams and producing said gaseous feedstream of (1) so that as the recycle ratio, as defined by the ratio of the moles of said stream of recycle gas to the moles of said fresh gas stream, is increased the temperature of the combined gaseous feedstream is increased to thereby achieve an increased reaction rate and a reduction in volume of catalyst in said first bed;
  (5) cooling said second stream of effluent gas from (4) to a temperature below the inlet temperature of the gaseous feedstream to the first catalyst bed in (1) and introducing said cooled second stream of effluent gas into the second bed of shift catalyst in said reaction zone, the volume of catalyst in said second bed being greater than the volume of catalyst in said first bed;
  (6) reacting said cooled gas stream in (5) at substantially the same pressure as in said first catalyst bed and at a temperature in the range of about 350° F. to 800° F. but below the reaction temperature in said first catalyst bed; and
  (7) withdrawing said hydrogen rich product gas from (6).

References Cited

UNITED STATES PATENTS

| | | | |
|---|---|---|---|
| 1,756,934 | 5/1930 | Beekley | 23—213 |
| 1,797,426 | 3/1931 | Larson | 23—213 |

(Other references on following page)

| | | UNITED STATES PATENTS | |
|---|---|---|---|
| 2,465,235 | 3/1949 | Kubicek | 23—213 |
| 2,631,086 | 3/1953 | Moak et al. | 23—213 |
| 2,829,113 | 4/1958 | Barry et al. | 252—376 |
| 3,150,931 | 9/1964 | Frank | 23—213 |
| 3,292,998 | 12/1966 | James | 23—213 |
| 3,303,001 | 2/1967 | Dienes | 23—213 |
| 3,345,136 | 10/1967 | Finneran, Jr. et al. | 23—213 |

| | | FOREIGN PATENTS | |
|---|---|---|---|
| 770,765 | 3/1957 | Great Britain | 23—213 |
| 285,387 | 2/1965 | Australia | 23—213 |
| 1,080,295 | 8/1967 | Great Britain | 23—213 |

EDWARD STERN, Primary Examiner

U.S. Cl. X.R.

23—150; 252—373

PO-1050
(5/69)

UNITED STATES PATENT OFFICE
CERTIFICATE OF CORRECTION

Patent No. 3,595,619      Dated July 27, 1971

Inventor(s) William L. Slater, James R. Muenger and Allen M. Robir

It is certified that error appears in the above-identified patent and that said Letters Patent are hereby corrected as shown below:

Column 5, line 62,    Change "HO" to -- $H_2O$ --

Signed and sealed this 18th day of July 1972.

(SEAL)
Attest:

EDWARD M. FLETCHER, JR.
Attesting Officer

ROBERT GOTTSCHALK
Commissioner of Patents